US009560119B2

United States Patent
Udupi et al.

(10) Patent No.: US 9,560,119 B2
(45) Date of Patent: Jan. 31, 2017

(54) ELASTIC SCALE OUT POLICY SERVICE

(71) Applicant: CISCO TECHNOLOGY, INC., San Jose, CA (US)

(72) Inventors: Yathiraj B. Udupi, San Jose, CA (US); Debojyoti Dutta, Santa Clara, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 191 days.

(21) Appl. No.: 14/581,783

(22) Filed: Dec. 23, 2014

(65) Prior Publication Data

US 2016/0182614 A1 Jun. 23, 2016

(51) Int. Cl.
| | |
|---|---|
| *G06F 15/173* | (2006.01) |
| *H04L 29/08* | (2006.01) |
| *H04L 29/06* | (2006.01) |
| *G06F 9/46* | (2006.01) |
| *G06Q 10/10* | (2012.01) |
| *H04L 12/24* | (2006.01) |

(52) U.S. Cl.
CPC .......... *H04L 67/10* (2013.01); *G06F 9/46* (2013.01); *H04L 41/00* (2013.01); *H04L 65/605* (2013.01); *G06Q 10/10* (2013.01); *G06Q 10/107* (2013.01); *H04L 29/06* (2013.01); *H04L 41/5048* (2013.01); *H04L 69/327* (2013.01); *H04L 69/329* (2013.01)

(58) Field of Classification Search
CPC ....... G06Q 10/10; G06Q 10/107; H04L 29/06; H04L 41/5048; H04L 69/327; H04L 69/329
USPC ................... 709/238, 227, 223, 217
See application file for complete search history.

(56) References Cited

U.S. PATENT DOCUMENTS

2002/0004844 A1* 1/2002 Harari ............... G06Q 10/10
709/238
2003/0187992 A1* 10/2003 Steenfeldt .......... H04L 29/06
709/227

OTHER PUBLICATIONS

"Drools Overview," Updated Aug. 7, 2014, Drools is part of the JBOSS Community www.jboss.org/, Page source https://github.com/droolsjbpm/drools-website/blob/master/index.html.haml, published by Red Hat, Inc., 2 pages.
Sandvine Intelligent Broadband Networks, "Distributed Decisions in Network Policy Control," Sandvine Incorporated ULC; First published on or about Jul. 20, 2014; 18 pages https://www.sandvine.com/downloads/general/whitepapers/distributed-decisions-in-network-policy-control.pdf.
"XACML (eXtensible access Control Markup Language)", Wikipedia, the free encyclopedia, Jan. 7, 2015, 7 pages; http://en.wikipedia.org/w/index.php?title=XACML&oldid=641409785.
(Continued)

*Primary Examiner* — Kyung H Shin
(74) *Attorney, Agent, or Firm* — Patent Capital Group

(57) ABSTRACT

In one embodiment, a scale out policy service for processing a stream of messages includes a distributed stream processing computation system comprising distributed stream processing nodes, a distributed storage system, and a rules engine. A stream processing engine of the distributed stream processing computation system can receive the stream of messages comprising requests and/or events, and assign a first message to be processed by one or more distributed stream processing nodes based on one or more properties of the message. The one or more distributed stream processing nodes can be communicably connected to the distributed storage system and/or the rules engine to provide (1) an answer in response to the first message and/or (2) cause an action to be executed based on the first message.

20 Claims, 8 Drawing Sheets

(56) References Cited

OTHER PUBLICATIONS

Alferes, et al., "An Event-Condition-Action Logic Programming Language," Technical Paper, Proceedings of Logics in Artificial Intelligence 10th European Conference, JELIA 2006, Liverpool, UK, Sep. 13-15, 2006; Springer-Verlag Berlin Heidelberg 2006, pp. 29-42 http://nozdr.ru/data/media/biblioteka/kolxo3/Cs_Computer_science/CsLn_Lecture%20notes/L/Logics%20in%20Artificial%20Intelligence,%2010%20conf.,%20JELIA%202006(LNCS4160,%20Springer,%202006)(ISBN%20354039625X)(527s).pdf#page=40.

Amazon Web Services, Inc., "Amazon Elastic Compute Cloud User Guide for Linux API-Version Oct. 1, 2014," Oct. 1, 2014, 707 pages.

Barazzutti, et al., "Elastic Scaling of a High-Throughput Content-Based Published/Subscribe Engine," Université de Neuchâtel, Switzerland, SAP SE, Dresden, Germany, Technische Universität Dresden, Germany, Distributing Computing Systems (ICDCS), 2014 IEEE 34th International Conference, Jun. 30, 2014-Jul. 3, 2014, Madrid, Spain, ISSN 1063-6927, 10 pages; http://se.inf.tu-dresden.de/pubs/papers/barazzutti2014ICDCS.pdf.

Barazzutti, et al., "Elastic Scaling of a High-Throughput Content-Based Published/Subscribe Engine," University of Neuchatel, Switzerland, SAP AG, Germany, TU Dresden, Germany, ICDCS 2014, Madrid, Spain, Jul. 6, 2014, 35 pages.

\* cited by examiner

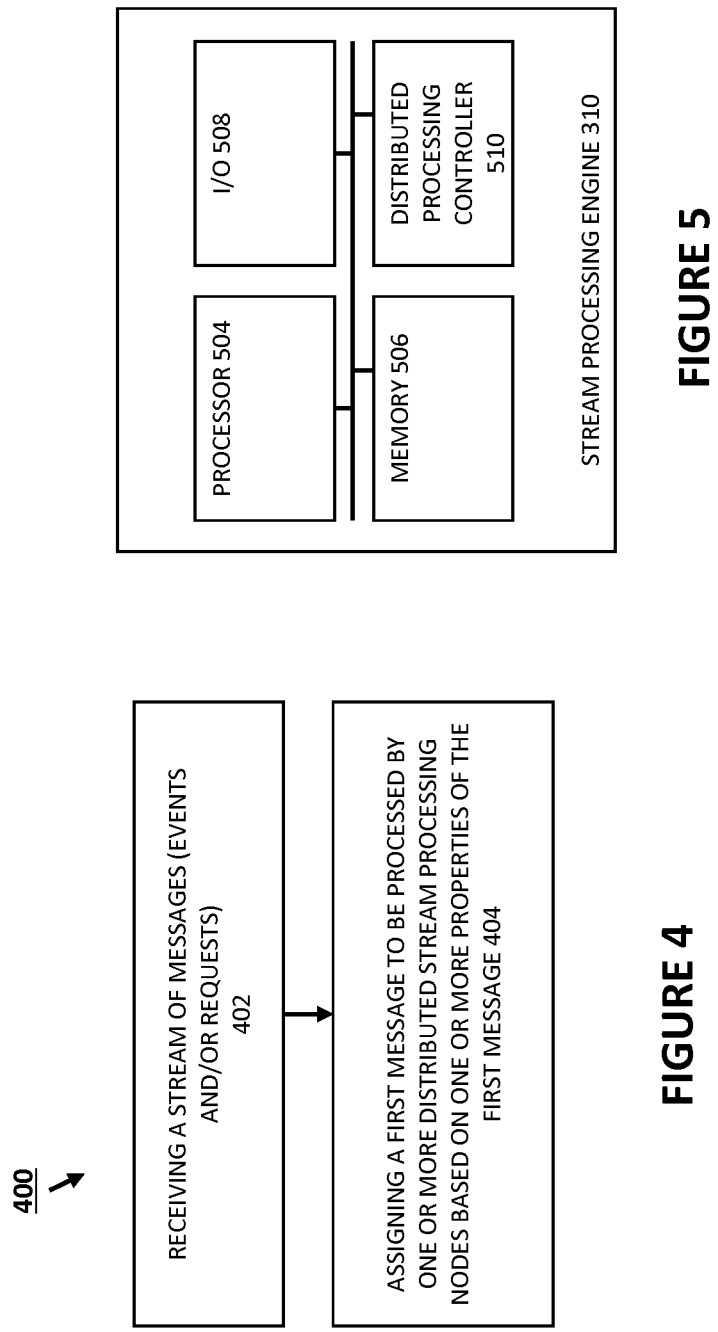

STREAM OF MESSAGES 602
(REQUESTS OR EVENTS)

STREAM OF MESSAGES 702
(REQUESTS AND EVENTS)

ELASTIC SCALE OUT POLICY SERVICE

TECHNICAL FIELD

This disclosure relates in general to the field of computing and, more particularly, to providing an elastic scale out policy service in cloud computing.

BACKGROUND

Computing is evolving at a fast pace. More often than not, the volume of information, jobs, and processes are continuing to grow bigger and bigger. Even though computer servers continue to become cheaper, the need for more computing resources continues to impose high costs for businesses wanting to have a large information technology infrastructure. To accommodate such growth and demand, cloud computing was introduced as a solution which aims to provide converged infrastructure, shared services, and economies of scale. For a user, the information technology infrastructure is called a "cloud" because the infrastructure is transparent to the user, as if obscured by a cloud.

Cloud computing utilizes large groups of remote servers that are networked together to provide high volume data storage and online access to computer services or resources. Cloud computing provides the infrastructure for resources to be shared by many services. In advanced cloud computing solutions, cloud computing provides the means for on-demand services where a cloud computer cluster can be allocated on-the-fly and/or a cloud service can be provisioned and be ready to go whenever the service is needed. These advanced cloud computing solutions have provided tremendous advantages including: flexibility, low up front infrastructure costs, agility, manageability, and speed. As user requirements and needs become more demanding, providing an optimal cloud computing system becomes more difficult and non-trivial.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 shows a flow diagram illustrating an exemplary method for providing a scale out policy service for processing a stream of messages, according to some embodiments of the disclosure;

FIG. 5 shows an exemplary stream processing engine of a scale out policy service for processing a stream of messages, according to some embodiments of the disclosure.

DETAILED DESCRIPTION OF EXAMPLE EMBODIMENTS

Overview

Figure 1:
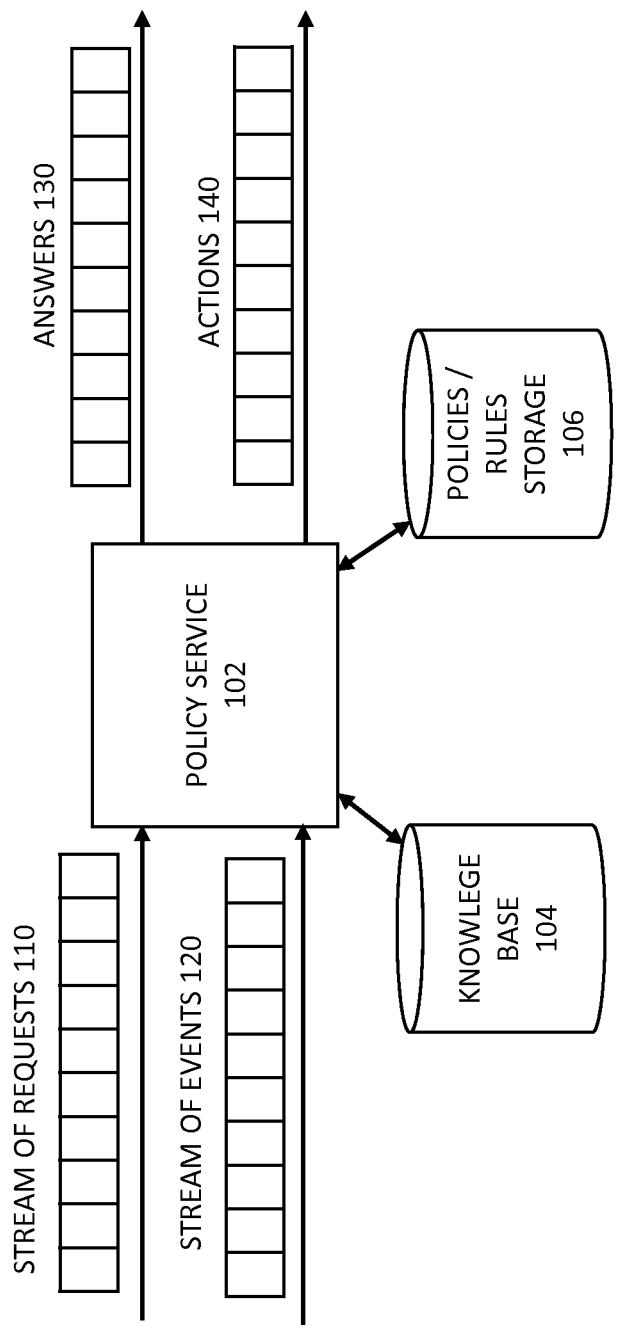
FIG. 1 illustrates an exemplary policy service, according to some embodiments of the disclosure.

An elastic scale out policy service is described herein. The policy can be deployed to provide intelligent decisions and take actions based on huge volumes of real-time data as incoming streams of messages and the existing knowledge base of information collected in accordance with the applicable policies. Many conventional policy solutions such as the rule based expert system are not designed to handle high volume of data and do not scale up. The elastic scale out policy service provides an architecture where the policy service can handle complex computations on unbounded streams of data, and provide a distributed scale out, fault-tolerant database solution for maintaining the knowledge base.

Various embodiments and variations for providing a scale out policy service for processing a stream of messages are described. The scale out policy service comprises a distributed stream processing computation system, which can include distributed stream processing nodes. The policy service further includes a distributed storage system and a rules engine. A stream processing engine of the distributed stream processing computation system receives the stream of messages comprising requests and/or events. The stream processing engine can assign a first message to be processed by one or more distributed stream processing nodes based on one or more properties of the message. The one or more distributed stream processing nodes are communicably connected to the distributed storage system and/or the rules engine to provide (1) an answer in response to the first message, and/or (2) cause an action to be executed based on the first message. The process of assigning messages to different distributed stream processing nodes provides the advantages of scalability, flexibility, and intelligence in handling policy decisions.

A scale out policy service for processing a stream of messages and variations thereof are described herein. The scale out policy service can include: a distributed stream processing computation system comprising distributed stream processing nodes and a stream processing engine, a distributed storage system communicably connected to one or more of the distributed stream processing nodes, and a rules engine communicably connected to one or more of the distributed stream processing nodes. The stream processing engine is configured to receive the stream of messages at a stream processing engine of the distributed stream processing computation system. The stream of messages can include requests and/or events. The stream processing engine can assign, a first message to be processed by one or more distributed stream processing nodes based on one or more properties of the first message. The one or more distributed stream processing nodes are communicably connected to the distributed storage system and/or the rules engine to provide (1) an answer in response to the first message and/or (2) cause an action to be executed based on the first message.

Example Embodiments

Understanding Policy Services

Among many kinds of services, one type of service cloud computing service is a policy service, where the cloud infrastructure offers policy-related functions such as making policy decisions, enforces actions according to policies, provides policy information, etc. Typically, a policy service implementation can include one or more policy modules. The modules can include, but are not limited to:

PAP: Policy Administration Point—Point which manages access authorization policies PDP: Policy Decision Point—Point which evaluates access requests against authorization policies before issuing access decisions PEP: Policy Enforcement Point—Point which intercepts user's access request to a resource, makes a decision request to the PDP to obtain the access decision (i.e. access to the resource is approved or rejected), and acts on the received decision PIP: Policy Information Point—The system entity that acts as a source of attribute values (i.e. a resource, subject, environment)

PRP: Policy Retrieval Point—Point where the access authorization policies are stored, typically a database or the filesystem.

FIG. 1 illustrates an exemplary policy service 102, according to some embodiments of the disclosure. The policy service 102 can receive a stream of requests 110 and a stream of events 120. The policy service 102 can respond to requests with answers 130. The policy service 102 can also trigger actions 140 or cause actions 140 to be executed in response to requests and/or events.

Depending on the application, the stream of requests 110 and the stream of events 120 can be received by the policy service 102 separate streams, or requests and events can be received on the same stream. In some cases, the policy service 102 can receive any number of streams. Within the context of the disclosure, a stream as used herein is generally a sequence of messages having requests and/or events. The stream can be buffered by a memory to avoid the situation where bursts of messages causes significant number messages to being dropped.

In some embodiments, a policy service 102 can receive a stream of requests 110, and in response, provide answers 130 based on information in the knowledge base 104 (e.g., a database of information) and/or policies and/or rules storage 106. A request can include a question, query, or any suitable request. Answers can include, e.g., yes ("authorized", "authenticated", "permit") or no ("not authorized", "not authenticated", "deny") type of answers, policy information, attribute information, etc. One example includes the policy service 102 responding to a request by providing provides one or more (yes/no, permit/deny) answers 130 in the context of access control.

In some embodiments, the policy service 102 can receive or listen to a stream of events 120 (representing information and/or updates about the states of a system), and triggers one or more actions 140 based on information in the knowledge base 104 and/or policies and/or rules storage 106. One example includes the policy service 102 monitoring incoming stream of events 120, and triggering action(s) (e.g., issuance of commands, or transmitting of messages to actors who can perform or execute the actions 140) based on information in the knowledge base 104 (e.g., storing the events) and/or applicable polic(-ies) in the policies and/or rules storage 106.

Understanding Policies and/or Rules

Figure 2:
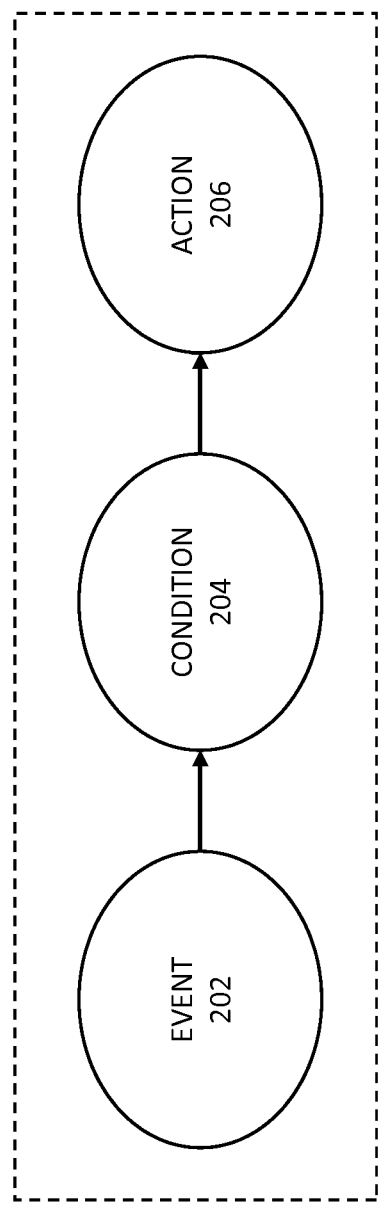
FIG. 2 illustrates exemplary structure for policies, according to some embodiments of the disclosure.

A policy service operates primarily based on policies and/or rules. The policies or rules are usually predefined by administrators of the system. This disclosure refers to policies and rules interchangeably. As described above, the policy service can provide answers based on rules, or trigger actions based on rules. To illustrate what rules are, FIG. 2 shows an exemplary structure for rules, according to some embodiments of the disclosure. Rules can be defined using an event-condition-action form, comprising event 202, condition 204, and action 206 (in this sequence). The form specifies, "On Event, If Condition, Do Action", which means that when event 202 occurs, if condition 204 is true, then execute action 206. Many rules can have such form, or variants of such form. The policy service can enforce such rules using a knowledge base, e.g., knowledge base 104, a current state of data stored in working memory or database, etc. Specifically, when an event arrives at the policy service, the policy services can:

check if any of the rules (e.g., in the policies and/or rules storage 106) specifies the event;

check whether the event and/or the information in the knowledge base satisfy the condition; and if so, take corresponding actions as defined by the applicable rules.

Considering the scenario where a policy service triggers actions based on the incoming events and the applicable rules, it is likely for the performance of such policy services to degrade as data volume of the knowledge base grows larger or the incoming rate of messages increases. Many policy services are not designed to handle high volume of data nor a high rate of incoming messages (especially events) and do not scale well, especially in scenarios involving continuous, real-time streams of messages in huge volumes. These scenarios include Internet of Things (IoT), cloud infrastructures, and any deployment involving long running heavy workloads resulting in a high volume of events that are to be acted upon.

An Improved Policy Service that is Elastic and Scalable

To accommodate the scenario where policy services are receiving stream(s) of messages in high volume, an improved policy service can be provided that can handle (unbounded) streams of messages on which policy decisions have to be taken. Usually, the messages can include real-time data. Furthermore, the improved policy service can include a knowledge base that is scalable, so that huge volumes of data can be maintained by the policy service taking policy decisions. Moreover, the improved policy service is elastic so that the amount of resources can scale up or scale down depending on the volume of messages or other factors.

Figure 3:
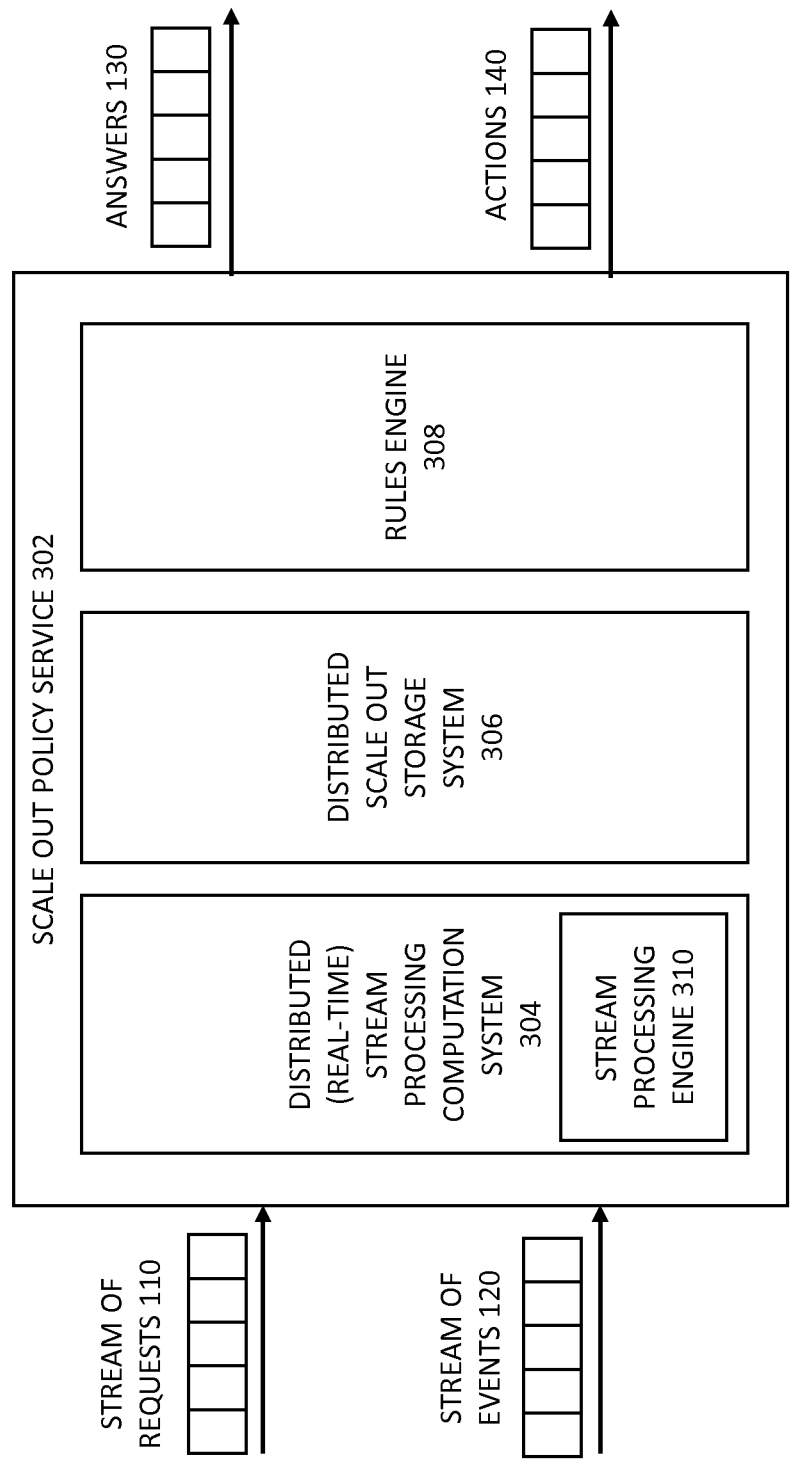
FIG. 3 illustrates an elastic scale out policy service, according to some embodiments of the disclosure.

FIG. 3 illustrates an elastic scale out policy service, according to some embodiments of the disclosure. To provide some of the above mentioned features, the scale out policy service 302 includes a distributed (real-time) stream processing computation system 304, a distributed (scale out) storage system 306 (as the knowledge base), and a rules engine 308 (for maintaining rules, and/or enforcement thereof). Similar to FIG. 1, the scale out policy service 302 can receive a stream of requests 110 and a stream of events 120, respond to requests with answers 130, and/or also trigger actions 140 or cause actions 140 to be executed in response to requests and/or events. The distributed stream processing computation system 304, the distributed storage system 306, and the rules engine 308 can be communicably connected to each other over a network, e.g., in a cloud computing cluster. Parts of such system can be provided by physical hardware resources in the cloud computing cluster.

The distributed stream processing computation system 304 can reliably process unbounded streams of data, which is particularly suitable for processing the incoming stream of messages (having requests and/or events). Usually, the distributed stream processing computation system 304 can include a plurality of distributed stream processing nodes that can be instantiated to process any number of input streams and produces any number of new output streams. The distributed stream processing nodes can include logic for performing computations such as functions, filters, streaming joins, streaming aggregations, communicating to other resources (e.g., the distributed storage system 306 and the rules engine 308), and so on. The distributed stream processing nodes can advantageously be configured according to one or more topologies, e.g., as a network of processing nodes configured to receive or monitor stream(s) of incoming messages, and pass messages to each other to perform policy processing. The distributed stream processing nodes can be provisioned using resources of a cloud computing cluster (e.g., using server machines). Examples of the distributed stream processing computation system 304 include Kafka, Storm, Spark, and any suitable distributed real-time fault-tolerant computation system.

The distributed storage system 306 can provide storage and retrieval of data, which can scale easily, even with large volumes of data. Such an advantage makes the distributed storage system 306 particularly suitable for managing a high volume of information for the knowledge base. The distributed storage system 306 can include a distributed scale out Not Only SQL (NoSQL) database system, which may have features such as: non-relational, distributed, horizontally scalable, schema-free, key-value stores, fault-tolerance, replication, etc. Examples of the distributed storage system 306 include Hadoop, HBase, Cassandra, Redis, and any suitable database technology.

The rules engine 306 can provide construction, maintenance, and/or enforcement of rules. For instance, the rules engine 306 can provide a framework for maintaining event-condition-action rules, or provide a suitable policy language in which rules can be defined. Such rules engine 306 can be particularly suitable for providing a rules management system and/or reasoning engine that can maintain and enforce rules governing the system, and providing the policy tool that can act upon the incoming stream of message, e.g., implement logic for generating answers, or triggering actions, in accordance with the knowledge base and the policy/rules storage. Examples of the rules engine 306 include Drools, Congress, and any suitable policy framework. Generally speaking, the rules engine 306 can act on an incoming event/request, and checks if any of the policies are applicable based on the current knowledge base that is available via adaptors to the distributed scale out storage system 306, and determines the answers, or what actions are to be triggered. An advantage of introducing a layer of distributed stream processing nodes (of the distributed stream processing computation system 304) in the processing pipeline is that the scale out policy service 302 can parallelize the event/request processing using distributed hashing of stateful elements. Hashing can be done based on properties, e.g., hashing between events or requests, hashing between messages of a particular type or a combination of types into different suitable distributed stream processing nodes for stateful lookup/processing. Once the messages or parts of messages are hashed, they can be directed to specific distributed stream processing nodes for further processing (e.g., using an address of the assigned distributed stream processing node, or tagging of the message (or part thereof) with a corresponding tag or value).

The resulting scale out policy service 302 leverages the distributed scale out storage system 306, as a distributed scale out knowledge base of incoming stream of events or any real-time data representing the state of the system. The distributed stream processing nodes can form pipelines to streamline the processing of the incoming messages, which can be stored in the distributed scale out storage system 306 before passing the processing onto (another) distributed stream processing node. The distributed scale out storage system advantageously provides a global and dynamic knowledge base on which the rules can be triggered. Adapters (or interfacing components and/or connections), if applicable, can be provided to connect the distributed scale out storage system 306 to the rules engine 308. Together, the distributed scale out storage system 306 and the rules engine 308 offer a scalable and fast knowledge base on which rules can be tested. The distributed stream processing computation system 304 offers a layer of scalable processing where a high volume of policy decisions can be made while leveraging the distributed scale out storage system 306 and the ability to run rules maintained by the rules engine 308 against the knowledge base managed by distributed scale out storage system 306.

Intelligent Processing of the Incoming Stream of Messages

It is noted that many conventional policy services do not scale up properly. Either the policy service does not provide the framework for processing streams of messages, or the policy service relies on a centralized policy decision point instance (creating a bottleneck and cannot be scaled up). With respect to the latter, some system may include distributed policy decision point instances in the network data plane, to make local policy decisions when sufficient information is available, otherwise escalate it further up. Such a system is limited to network access control kind of scenarios, and not necessarily addressing the scale of incoming events or the size of knowledge bases.

The improved elastic scale out policy service 302 does not suffer from these shortcomings due to the non-trivial combination of the distributed stream processing computation system 304, the distributed scale out storage system 306, and the rules engine 308. One advantage of separating the stream processing from the rules and knowledge base is the ability to scale up or down the incoming streams without being too tightly coupled with the systems managing the rules and the knowledge base. A further advantage is the ability to provide a distributed stream processing computation system that can orchestrate high volume policy processing in a flexible and intelligent manner.

The implementation of these systems cooperating together to form an elastic scale out policy service 302 is not trivial, and one important feature involves intelligent hashing of the stream of messages so that the stream of messages can be processed properly and efficiently by the distributed stream processing computation system 304 of the elastic scale out policy service 302. Such intelligent hashing can be performed by a specially configured stream processing engine 310 of a scale out policy service. The stream processing engine 310 can be a part of the distributed stream processing computation system 304, or can interface between the incoming stream of messages and the distributed stream processing computation system 304.

FIG. 4 shows a flow diagram illustrating an exemplary method for providing a scale out policy service for processing a stream of messages, according to some embodiments of the disclosure. The method 400 includes a stream processing engine of the distributed stream processing computation system receiving a stream of messages (box 402). Generally speaking, the stream of messages can include requests and/or events. In some cases, the stream processing engine can receive a plurality of streams of messages.

To intelligently hash the incoming stream of messages to offer scalable processing, the stream processing engine can assign a first message to be processed by one or more distributed stream processing nodes based on one or more properties of the message. The one or more properties may provide an indication as to which distributed stream processing node is more suitable for processing the first message. Cooperating together as a scale out policy service, the one or more distributed stream processing nodes are communicably connected to the distributed storage system and/or the rules engine to provide (1) an answer in response to the first message and/or (2) cause an action to be executed based on the first message.

Through intelligent hashing, stream of messages can be processed effectively and efficiently even at high volume, due to features such as pipelining policy processing of the messages (e.g., through dependency analyses), and parallelizing policy processing of the messages. The intelligent hashing involves assigning the messages, and in some cases, parts of the messages to desirable distributed stream processing nodes. To provide intelligent hashing, the rules governing these assignments can be designed specifically to the nature of policy processing. Further details of the method and parts of the scale out policy service, e.g., intelligent hashing and distributed processing of messages (and its parts) are described further in relation to FIGS. 6-10.

The method 400 of FIG. 4 can be performed by a stream processing engine 310, whose details are described in relation to FIG. 5. FIG. 5 shows an exemplary stream processing engine 310 of a scale out policy service for processing a stream of messages, according to some embodiments of the disclosure. Generally speaking, the stream processing engine 310 can be implemented in a distributed manner, e.g., using one or more distributed stream processing nodes, so that even the stream processing engine 310 can scale up or down if the number of messages in the stream increases or decreases. The stream processing engine can include at least one memory element 506, at least one processor 504 coupled to the at least one memory element, and a specially designed distributed processing controller 510 that when executed by the at least one processor 504 is configured to receive the stream of messages of the distributed stream processing computation system, the stream of messages comprising requests and/or events (corresponding to box 402 of FIG. 4), and assign a first message to be processed by one or more distributed stream processing nodes based on one or more properties of the message (corresponding to box 404 of FIG. 4). The one or more distributed stream processing nodes are communicably connected to the distributed storage system and/or the rules engine to provide (1) an answer in response to the first message and/or (2) cause an action to be executed based on the first message.

The memory 506 can include one or more computer-readable non-transitory media, which can include one or more instructions, for providing a scale out policy service for processing a stream of messages, said scale out policy service comprising a distributed stream processing computation system comprising distributed stream processing nodes, a distributed storage system, and a rules engine. When the one or more instructions are executed on the processor 504, the one or more instructions can configure the processor to perform one or more operations related to the methods described herein.

Various Types of Distributed Stream Processing Nodes

The stream processing engine 310 of FIG. 5 leverages an important feature of the distributed stream processing computation system 304 of FIG. 3, which is the ability to provision a variety of distributed stream processing nodes to perform a range of functions. If Storm is used as the distributed stream processing computation system, the distributed stream processing nodes correspond to "Bolts". These distributed stream processing nodes can be pipelined, and some can perform processing in parallel with each other. A topology interconnecting the distributed stream processing nodes can provide a scalable and sophisticated network of processing nodes to efficiently process the stream of messages. To illustrate the complex stream processing that can be carried out and orchestrated by the distributed stream processing computation system 304 of FIG. 3, the following passages outline exemplary types of distributed stream processing nodes.

One exemplary distributed stream processing node is an event processing node. An event processing node can serve or form a source of incoming streams of events. In a scalable system, there can be a plurality of event processing nodes monitoring and passing incoming streams of events (so as to avoid a bottleneck situation). Some event processing streams can perform some processing to split or join streams of events to facilitate scalable processing of events. Depending on the application, there can be one or more event processing nodes that can be added to the pipeline that feeds all the incoming streams of events, or any data coming out of the applications that deploy this policy service. One function of the event processing node can include feeding the event or data derived from the event to the distributed scale out storage system 306 of FIG. 3, e.g., ensuring that information/data in these events are stored in the distributed scale out storage system. These event processing nodes can ensure the events and any suitable data are emitted to the next processing node in the pipeline, if applicable. For instance, the event can trigger (or be distributed to) another distributed stream processing node to check for applicable policies, which could in turn trigger policy processing of those applicable policies by distributing the event to other processing nodes. Several (event) processing nodes can provide lightweight or minimal filtering of the information/data in the events before storing the information/data in the distributed scale out storage system 306 of FIG. 3. Advantage of having event processing nodes is the ability to distribute the high volume of event processing over many nodes.

Another exemplary distributed stream processing node is a request processing node. A request processing node can serve or form a source of incoming streams of requests. Depending on the application, there can be one or more requests processing nodes that can be added to the pipeline that feeds all the incoming streams of requests. One function of the requests processing node can include feeding the requests to other processing nodes configured to process the request. These requests processing nodes can ensure the requests are emitted to the next processing node in the pipeline, if applicable. In a scalable system, there can be a plurality of request processing nodes monitoring and passing incoming streams of requests (so as to avoid a bottleneck situation). Some request processing streams can perform some processing to split or join streams of requests to facilitate scalable processing of requests. Advantage of having request processing nodes is the ability to distribute the high volume of request processing over many nodes.

Another exemplary distributed stream processing node is a hashing processing node, one or more of said hashing processing nodes can make up a "stream processing engine". One or more (distributed) hashing processing node is generally provided to divide up the stream of messages and forward/assign messages or parts of messages to appropriate policy processing nodes. Intelligent hashing is non-trivial because policy service processes may have to be hashed and pipelined properly to ensure proper operation. In some cases, there can be many hashing processing nodes which can intelligently hash messages and/or parts thereof in a distributed fashion. Advantageously, the hashing and processing of incoming messages do not suffer from a bottleneck, and allowing the distributed stream processing computation system to scale.

Another exemplary distributed stream processing node is a policy processing node. One function of the policy processing node can include checking whether the event has any rules (managed by the rules engine 308) that refer to the event (e.g., in the form of event-condition-action). Another function of a policy processing node can include triggering the rules engine (e.g., rules engine 308) to check whether condition(s) of a rule are true, e.g., based on the knowledge base. Yet a further function of a policy processing node can include triggering an action based on the result of checking the condition of an applicable rule. Yet another function of the event policy processing node can include processing a request to generate, e.g., the yes/no decision (where an application wants to determine access control/authorization decisions). The policy processing node can orchestrate policy decisions triggered by events and/or policy decisions in response to requests (with the assistance from the distributed scale out storage system 306 and the rules engine 308). In some cases, the policy processing node can invoke other services to take the corresponding actions as specified by the triggered policies. There can be many policy processing nodes arranged in a pipeline, and policy processing nodes can perform processing in parallel with each other.

Many of the above mentioned nodes can be configured in a flexible topology, which can adapt based on the volume of messages, and the types of messages being received. The result is a scale out policy service 302 that provide elastic scaling. The architecture offers configurability and capabilities for scaling up and down when desired, e.g., increasing or decreasing, the number of processing nodes of the distributed stream processing computation system as well as data storage nodes in the distributed scale out storage system 306.

It is envisioned that there can be many topologies for building a scale out pipeline with processing nodes. For instance, for further processing of events or requests before or after the policy processing, additional number of distributed stream processing nodes can be introduced in the pipeline.

Intelligent Hashing Based on Properties

To properly distribute policy processing in the distributed stream processing computation system, a stream processing engine 310 (e.g., implementing a distributed processing controller, as one or more distributed stream processing nodes, or as a separate engine), can provide a mechanism of parallelizing the policy processing of real-time events or requests using distributed hashing of stateful elements. Hashing, as used herein, refers to the task of distributing requests, events, parts of requests, parts of events, etc. to different pipelines. The hashing can be done based on certain stream properties such that events or requests of a particular type or a combination of types are passed to the same distributed stream processing nodes. In some embodiments, the hashing can be performed according to a hash function, or a random distribution.

A stream processing engine (e.g., the distributed processing controller) can then assign the messages according to a rule or formula which relates one or more properties to corresponding distributed stream processing nodes of the distributed stream processing computation system. In some cases, the intelligent hashing helps increase efficiency of the system by assigning messages or parts of messages to distributed stream processing nodes which are more suited to perform the processing. These properties can relate to the form of the message, type of the message, origin of the message, hash value of the message, metadata of the message, length of the message, tags of the message, dependencies with other events/requests, state of the message, or any suitable extractable attributes of the message. For instance, one extractable attribute of the message can include a severity of the message. For log events, the severity of the message can be one of the following examples: ERROR, WARNING, INFO, etc. In some cases, the hashing can (further or alternately) depend on properties of the distributed hashing nodes (e.g., processing node utilization (statistics), a sequence or order in which the distributed hashing nodes are to be utilized, states of the processing nodes, network distance of the processing node, cost of using the processing node), and/or states of the system (e.g., time of day, day of the week, location of the scale out policy service, etc.)

Figure 6:
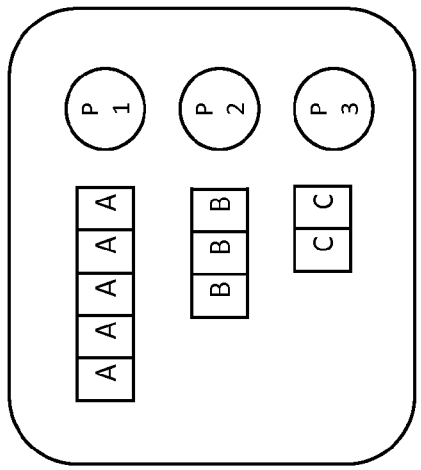
FIG. 6 illustrates an exemplary scheme for assigning messages to different stream processing nodes, according to some embodiments of the disclosure.

FIG. 6 illustrates an exemplary scheme for assigning messages to different stream processing nodes, according to some embodiments of the disclosure. In the example shown, the stream of messages 602 can include requests or events, and the messages may have properties "A", "B", or "C" (as an illustration). For a simple case, distributed stream processing nodes having the property "A" is assigned to processing node "P1", distributed stream processing nodes having the property "B" is assigned to processing node "P2", distributed stream processing nodes having the property "C" is assigned to processing node "P3", and so on.

Figure 7:
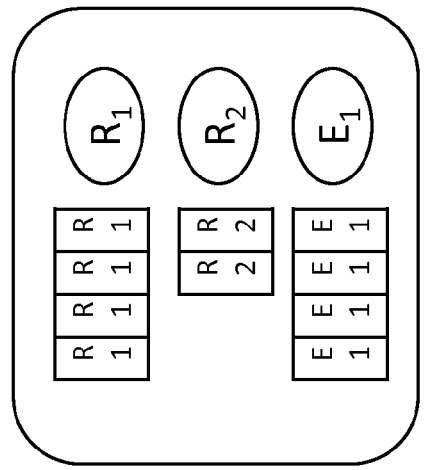
FIG. 7 illustrates another exemplary scheme for assigning messages to different stream processing nodes, according to some embodiments of the disclosure.

FIG. 7 illustrates another exemplary scheme for assigning messages to different stream processing nodes, according to some embodiments of the disclosure. In the example shown, the stream of messages 702 can include requests or events, and the messages may have properties "A", "B", or "C" (as an illustration). In this case, distributed stream processing nodes having the properties "R" and "1" is assigned to processing node "$R_1$", distributed stream processing nodes having the properties "R" and "2" is assigned to processing node "$R_2$", distributed stream processing nodes having the properties "E" is assigned to processing node "$E_1$", and so on.

EXAMPLE

Pipelining Data Store Distributed Stream Processing Node and Policy Processing Distributed Stream Processing Node In some embodiments, a first property of the first message (in the stream of messages) indicates whether the first message is a request or an event. Broadly speaking, a request requests an answer from the scale out policy service, and an event comprises event information to be added to the distributed storage system and can cause one or more actions to be executed if one or more conditions are met. Accordingly, the stream processing engine (e.g., distributed processing controller) can assign the first message to a first set of one or more distributed stream processing nodes if the first property indicates the first message is a request. The stream processing engine can also assign the first message to a second set of one or more distributed stream processing nodes if the first property indicates the first message is an event. Advantageously, requests and events can kick off different/separate processing pipelines.

For instance, a first distributed stream processing node can transmit event information of the first message to the distributed storage system to maintain a knowledge base. A second distributed stream processing node (connected to the output of the first distributed stream processing node, or downstream of the first distributed stream processing node) can then perform determine (e.g., from the rules engine) whether the event information triggers a policy to be executed in response to the event information.

Example

Intelligent Hashing and Dependency Analyses

Pipelining events and requests can be tricky if the events and/or requests are stateful, and can have dependencies with each other. The events and/or requests can form an acyclic (or in some cases partially cyclic) graph with nodes of the graph being the events and/or requests, and directed edges representing dependencies between the events and/or requests. For this reason, some embodiments may include a stream processing engine that can perform dependence analysis of the first message and a second message of the stream of messages (and many further messages). The stream processing engine can then assign the first message and the second message to be processed by one or more distributed stream processing nodes based on the dependence analysis. Dependencies can occur, e.g., if an event changes the state of the system, and a subsequent request can depend on the state of the system.

Generally speaking, if two messages depend on each other, the dependency can be respected by pipelining the processing of one message after another, through provisioning of a proper topology of a plurality of distributed stream processing nodes. The topology can provision a distributed stream processing node to listen to the output of another distributed stream processing node, for example. If two messages do not depend on each other For instance, the stream processing engine can create a pipeline comprising the one or more distributed stream processing nodes assigned to process the first message and the second message (according to a particular order) if a dependence analysis indicates the first message depends on the second message or vice versa. In some cases, the stream processing node can assign the first message and the second message to be processed by two (separate) distributed stream processing nodes configured to process the first message and the second message (respectively) and in parallel if a dependence analysis indicates the first message and the second message do not depend on each other.

Hashing Parts of Messages

Figure 8:
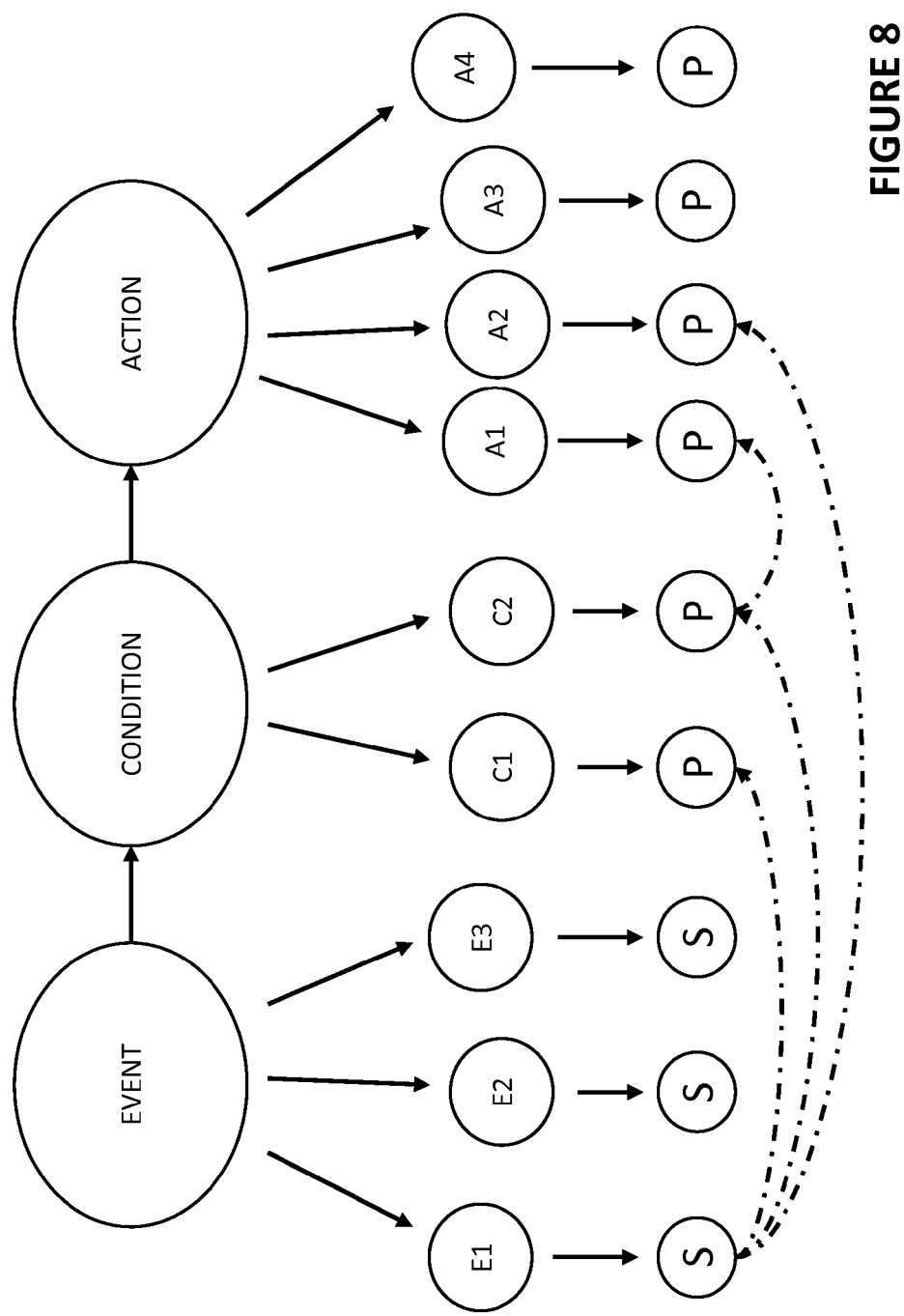
FIG. 8 illustrates another exemplary scheme for assigning parts of a message to different stream processing nodes, according to some embodiments of the disclosure.

FIG. 8 illustrates another exemplary scheme for assigning parts of a message to different stream processing nodes, according to some embodiments of the disclosure. The illustration shows that an example of rule in the event-condition-action form. The policy processing of the rule would generally occur in the order of (1) event, (2) condition, and (3) action. At this level, the processing of the rule can be broken up into 2 or 3 parts, whose processing can be pipelined and performed by a plurality of distributed stream processing nodes. For example, one distributed stream processing node can perform processing of the event part, another distributed stream processing node can perform processing of the condition part, and another distributed stream processing node can perform the processing of the action part. The three distributed stream processing nodes can be connected in series in the topology.

Further to separating parts of the policy processing of the rule into these three parts, each of the parts can also have constituent parts within it, as shown in FIG. 8. For instance, the event part may check for three events "E1", "E2" and "E3", the condition part may check conditions "C1" and "C2", and the action may include parts "A1", "A2", "A3", and "A4". Any one or more of these parts can be hashed to be processed by separate distributed stream processing nodes. Note that some of these parts may have dependencies with each other (indicated by arrows with dotted lines), which could affect pipelining or parallel processing of these parts. For instance, the stream processing engine can process the first message to determine parts of the first message, wherein the parts of the first message are assigned to be processed by different distributed stream processing nodes. Both requests and events can potentially be divided into parts, if desired. If two parts of the first message are determined to not be dependent on each other, assigning the two parts to different distributed stream processing nodes configured to process the two parts in parallel. If two parts of the first message are determined to be dependent on each other, assigning the two parts to different distributed stream processing nodes configured in a pipeline to process the two parts in sequence.

System Overview

Figure 9:
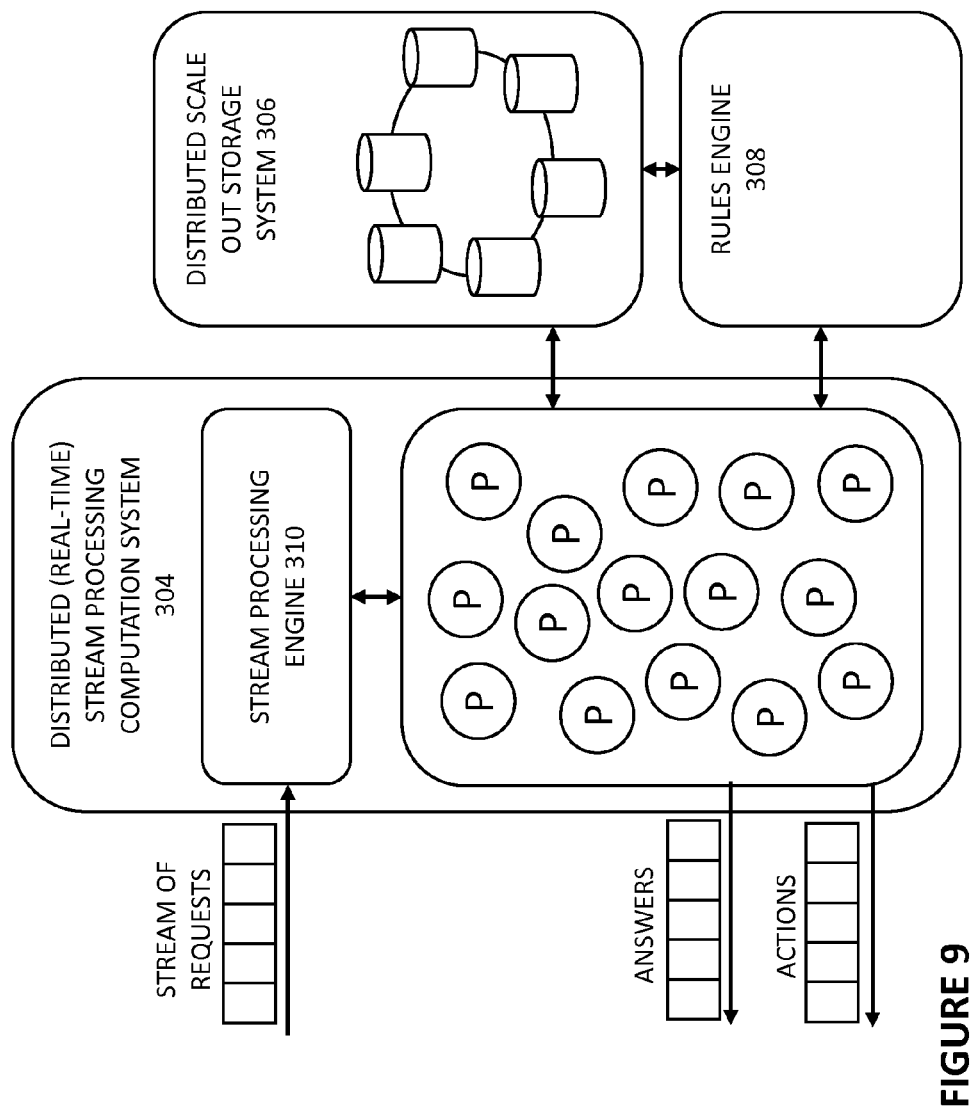
FIG. 9 illustrates an exemplary implementation of an elastic scale out policy service for processing a stream of requests, according to some embodiments of the disclosure.
Figure 10:
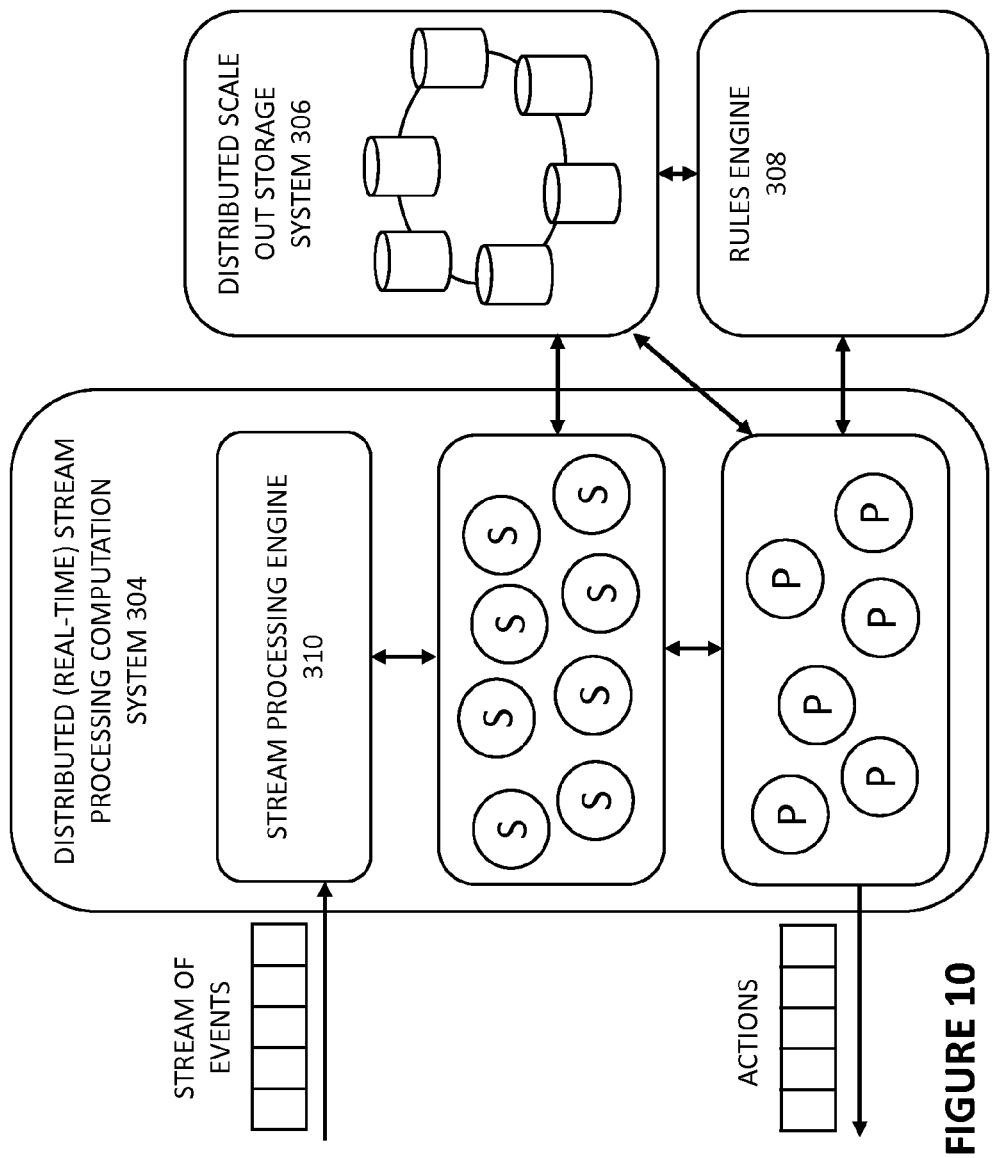
FIG. 10 illustrates another exemplary implementation an elastic scale out policy service for processing a stream of events, according to some embodiments of the disclosure.

To further illustrate the elastic scale out policy service, FIGS. 9 and 10 show two system overviews, which are described with respect to processing of requests and processing of events. FIG. 9 illustrates an exemplary implementation of an elastic scale out policy service for processing a stream of requests, according to some embodiments of the disclosure. In this example, a stream of requests is monitored by the distributed (real-time) stream processing computation system 304 (in some cases, the distributed stream processing computation system 304 listens to requests). The stream processing engine 310 can process the incoming stream so that the requests can be assigned to processing nodes accordingly. In some cases, the assignment and hashing can be performed using hashing processing nodes (not shown). In this example, a processing nodes labeled with "P" are policy processing nodes, which can be provisioned to perform policy processing for the incoming requests or parts of the requests. For instance, a first policy processing nodes can check whether one or more conditions specified in the request is true using the knowledge base managed by the distributed scale out storage system. In another instance, a second policy processing nodes (e.g., downstream to the first policy processing node) can trigger the execution of one or more actions based on the outcome of checking the one or more conditions, and/or generate an answer according to the outcome of checking the one or more conditions.

FIG. 10 illustrates another exemplary implementation an elastic scale out policy service for processing a stream of events, according to some embodiments of the disclosure. In this example, a stream of events is monitored by the distributed (real-time) stream processing computation system 304 (in some cases the distributed stream processing computation system listens to events). The stream processing engine 310 can process the incoming stream so that the events can be assigned to processing nodes accordingly. In some cases, the assignment and hashing can be performed using hashing processing nodes (not shown). In this example, a plurality of processing nodes labeled with "S" are event processing nodes, which can be configured to store the event information in the events in the distributed scale out storage system 306. Furthermore, a processing nodes labeled with "P" are policy processing nodes, which can be provisioned to perform policy processing. For instance, the event processing nodes can pass event information to the policy processing nodes to determine whether there are applicable policies in the rules engine 308 specifying the event. If there are applicable policies, further policy processing nodes can be provisioned to perform policy processing according to the applicable policies (e.g., check conditions, trigger actions, etc.).

Elastic Scaling

Not only the elastic scale out system can provide high volume policy processing, the system architecture enables the state of the systems to be separated from the rules and policies. Effectively, three components to the elastic scale out system, i.e., the policy processing, the state of the systems, and the rules/policies are decoupled from each other, thereby allowing each component to scale up and down (in an agile manner). For instance, the distributed stream processing computation system and/or the distributed storage system can be scaled based on the volume of messages in the stream of messages.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the cloud computing operations thereof. This may be inclusive of appropriate algorithms and communication protocols that allow for the effective exchange of data or information.

In one implementation, stream processing engine and various parts of the scale out policy service described herein may include software to achieve (or to foster) the functions discussed herein for providing the elastic scale out policy service where the software is executed on one or more processors to carry out the functions. This could include the implementation of instances of distributed processing controller and/or any other suitable element that would foster the activities discussed herein. Additionally, each of these elements can have an internal structure (e.g., a processor, a memory element, etc.) to facilitate some of the operations described herein. In other embodiments, these functions for elastic scale out policy service may be executed externally to these elements, or included in some other network element to achieve the intended functionality. Alternatively, these elements may include software (or reciprocating software) that can coordinate with other network elements in order to achieve the elastic scale out policy service functions described herein. In still other embodiments, one or several devices may include any suitable algorithms, hardware, software, components, modules, interfaces, or objects that facilitate the operations thereof.

In certain example implementations, the elastic scale out policy functions, e.g., the functions related to the distributed processing controller of the stream processing engine, outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store data, e.g., which enable intelligent hashing of stream of messages disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving elastic scale out policy service as outlined herein (e.g., knowledge base, and rules). Additionally, each of these devices may include a processor that can execute software or an algorithm to perform the elastic scale out policy service functions as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of enabling an elastic policy service, as potentially applied to a myriad of other architectures.

It is also important to note that the steps in the FIG. 4 illustrate only some of the possible scenarios that may be executed by, or within, the stream processing engine described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by elastic scale out policy service in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for providing a scale out policy service for processing a stream of messages, said scale out policy service comprising a distributed stream processing computation system comprising distributed stream processing nodes, a distributed storage system, and a rules engine, the method comprising:
   receiving, at a stream processing engine of the distributed stream processing computation system, the stream of messages comprising events, wherein each event comprises event information to be added to the distributed storage system and causes one or more actions to be executed according to rules in the rules engine; and
   performing, by the stream processing engine, dependence analysis of the stream of messages based on the rules in the rules engine defined in an order of event, condition, and action, including determining a first message depends on a second message;
   provisioning a topology for the distributed stream processing nodes based on the dependence analysis including creating a first pipeline of two distributed stream processing nodes to process the first message and the second message respectively; and
   assigning, by the stream processing engine, the stream of messages to be processed by the distributed stream processing nodes having the topology.

2. The method of claim 1, wherein:
   the stream of messages further comprises requests; and
   the method further comprises:
      determining whether a third message in the stream of messages is a request or an event;
      assigning, by the stream processing engine, the third message to a first set of one or more distributed stream processing nodes if the third message is a request; and
      assigning, by the stream processing engine, the third message to a second set of one or more distributed stream processing nodes if the third message is an event.

3. The method of claim 2, wherein a request requests an answer from the scale out policy service.

4. The method of claim 1, further comprising:
   transmitting, by a first distributed stream processing node, event information of a fourth message to the distributed storage system to maintain a knowledge base; and
   determining, by a second distributed stream processing node downstream of the first distributed stream processing node, whether the event information triggers a policy to be executed in response to the event information.

5. The method of claim 4, wherein the first distributed stream processing node and the second distributed stream processing node are communicably connected in sequence to implement a pipeline.

6. The method of claim 1, wherein creating the first pipeline comprises provisioning a distributed stream processing node to listen to an output of another distributed stream processing node.

7. The method of claim 1, further comprising:
processing a rule in the rules engine to determine a plurality of parts of the rule; and
assigning a plurality of distributed stream processing nodes to process respective parts of the rule.

8. The method of claim 1, further comprising:
determining the first message does not depend on the second message; and
assigning the first message and the second message to be processed by two distributed stream processing nodes configured to process the first message and the second message respectively and in parallel in response to the determination that the first message does not depend on the second message.

9. The method of claim 1, further comprising:
processing, by the stream processing engine, the first message to determine parts of the first message, wherein the parts of the first message are assigned to be processed by different distributed stream processing nodes.

10. The method of claim 9, further comprising:
if two parts of the first message are determined to not be dependent on each other, assigning the two parts to different distributed stream processing nodes configured to process the two parts in parallel; and
if two parts of the first message are determined to be dependent on each other, assigning the two parts to different distributed stream processing nodes configured in a second pipeline to process the two parts in sequence.

11. The method of claim 1, wherein the distributed stream processing nodes comprises distributed stream processing nodes connected to the distributed storage system to provide an answer in response to messages in the stream of messages, and distributed stream processing nodes connected to the rules engine to cause one or more actions to be executed messages in the stream of messages.

12. The method of claim 1, further comprising:
scaling the distributed stream processing computation system and/or the distributed storage system based on the volume of messages in the stream of messages.

13. A stream processing engine of a scale out policy service for processing a stream of messages, said scale out policy service comprising a distributed stream processing computation system comprising distributed stream processing nodes, a distributed storage system, and a rules engine, the stream processing engine comprising:
at least one memory element;
at least one processor coupled to the at least one memory element; and
a distributed processing controller that when executed by the at least one processor is configured to:
receive the stream of messages of the distributed stream processing computation system, the stream of messages comprising events, wherein each event comprises event information to be added to the distributed storage system and causes one or more actions to be executed according to rules in the rues engine;
perform dependence analysis of the stream of messages based on the rules in the rules engine defined in an order of event, condition, and action, including determining a first message depends on a second message;
provision a topology for the distributed stream processing nodes based on the dependence analysis including creating a first pipeline of two distributed stream processing nodes to process the first message and the second message respectively; and
assign the stream of messages to be processed by the distributed stream processing nodes having the topology.

14. The stream processing engine of claim 13, wherein:
the stream of messages further comprises requests; and
the distributed processing controller is further configured to:
determine whether a third message in the stream of messages is a request or an event;
assign the third message to a first set of one or more distributed stream processing nodes if the third message is a request; and
assign the third message to a second set of one or more distributed stream processing nodes if the third message is an event.

15. The stream processing engine of claim 13, wherein:
a first distributed stream processing node is configured to transmit event information of a fourth message to the distributed storage system to maintain a knowledge base; and
a second distributed stream processing node downstream of the first distributed stream processing node is configured to determine whether the event information triggers a policy to be executed in response to the event information.

16. The stream processing engine of claim 15, wherein the first distributed stream processing node and the second distributed stream processing node are communicably connected in sequence to implement a pipeline.

17. One or more computer-readable non-transitory media comprising one or more instructions, for providing a scale out policy service for processing a stream of messages, said scale out policy service comprising a distributed stream processing computation system comprising distributed stream processing nodes, a distributed storage system, and a rules engine, that when executed on one or more processors configure the one or more processors to perform one or more operations comprising:
receiving, at a stream processing engine of the distributed stream processing computation system, the stream of messages comprising events, wherein each event comprises event information to be added to the distributed storage system and causes one or more actions to be executed according to rules in the rules engine;
performing, by the stream processing engine, dependence analysis of the stream of messages based on the rules in the rules engine defined in an order of event, condition, and action, including determining a first message depends on a second message;
provisioning a topology for the distributed stream processing nodes based on the dependence analysis including creating a first pipeline of two distributed stream processing nodes to process the first message and the second message respectively; and
assigning, by the stream processing engine, the stream of messages to be processed by the distributed stream processing nodes having the topology.

18. The media of claim 17, wherein creating the first pipeline comprises provisioning a distributed stream processing node to listen to an output of another distributed stream processing node.

19. The media of claim 17, wherein the operations further comprises:
processing a rule in the rules engine to determine a plurality of parts of the rule; and assigning a plurality of distributed stream processing nodes to process respective parts of the rule.

20. The media of claim 17, wherein the operations further comprises:

determining the first message does not depend on the second message; and assigning the first message and the second message to be processed by two distributed stream processing nodes configured to process the first message and the second message respectively and in parallel in response to the determination that the first message does not depend on the second message.

\* \* \* \* \*